(12) United States Patent
Sechny (10) Patent No.: US 10,054,462 B2
(45) Date of Patent: Aug. 21, 2018

(54) METHOD OF DISPLAYING A MAP VIEW AND NAVIGATION DEVICE

(71) Applicant: Harman Becker Automotive Systems GmbH, Karlsbad (DE)

(72) Inventor: Marek Sechny, Bratislava (SK)

(73) Assignee: HARMAN BECKER AUTOMOTIVE SYSTEMS GMBH, Karlsbad (DE)

(*) Notice: Subject to any disclaimer, the term of this patent is extended or adjusted under 35 U.S.C. 154(b) by 159 days.

(21) Appl. No.: 14/328,403

(22) Filed: Jul. 10, 2014

(65) Prior Publication Data

US 2015/0025783 A1 Jan. 22, 2015

(30) Foreign Application Priority Data

Jul. 17, 2013 (EP) .................................. 13176792

(51) Int. Cl.
*G01C 21/36* (2006.01)
*G01C 21/34* (2006.01)
*G09B 29/00* (2006.01)

(52) U.S. Cl.
CPC ......... *G01C 21/3667* (2013.01); *G01C 21/34* (2013.01); *G01C 21/3492* (2013.01); *G09B 29/007* (2013.01)

(58) Field of Classification Search
None
See application file for complete search history.

(56) References Cited

U.S. PATENT DOCUMENTS

| | | | | | |
|---|---|---|---|---|---|
| 5,568,390 | A * | 10/1996 | Hirota | ................ | G01C 21/3469 340/990 |
| 6,317,686 | B1 * | 11/2001 | Ran | ..................... | G01C 21/3691 701/117 |
| 6,865,480 | B2 * | 3/2005 | Wong | ................. | G01C 21/3694 340/988 |
| 7,634,352 | B2 * | 12/2009 | Soulchin | ............ | G01C 21/3635 340/933 |
| 8,086,402 | B2 * | 12/2011 | Kindo | ................ | G01C 21/3407 340/995.15 |
| 8,452,530 | B2 * | 5/2013 | Inoguchi | ............ | G01C 21/3407 701/414 |
| 8,669,885 | B2 * | 3/2014 | Swope, III | ........... | G08G 1/0962 340/990 |
| 8,831,873 | B2 * | 9/2014 | Tamayama | ........... | G01C 21/343 701/410 |
| 2006/0253246 | A1 * | 11/2006 | Cera | ................ | G08G 1/096861 701/117 |
| 2012/0150436 | A1 * | 6/2012 | Rossano | ............ | G01C 21/3694 701/450 |

OTHER PUBLICATIONS

Official Journal EPO dated Nov. 2007, pp. 592ff and 594ff.
European Search Report for EP 13176792.3, dated Dec. 20, 2013.

* cited by examiner

*Primary Examiner* — Redhwan K Mawari
*Assistant Examiner* — Edward Torchinsky
(74) *Attorney, Agent, or Firm* — Artegis Law Group, LLP (57) ABSTRACT

Techniques of displaying a map view (200) for navigation of a vehicle are described. The map view includes graphical representation of predictive traffic information (220-1, 220-2, 220-3) respectively at an estimated time of passing of a corresponding road segment (210).

1 Claim, 6 Drawing Sheets

| Road segment | Forecast time interval | Flow | Other |
|---|---|---|---|
| A | 0 min – 15 min | 80 km/h | n/a |
| A | 15 min – 30 min | 60 km/h | n/a |
| A | 30 min – 45 min | 20 km/h | heavy rain |
| B | 0 min – 15 min | n/a | n/a |
| B | 15 min – 30 min | n/a | n/a |
| B | 30 min – 45 min | n/a | construction site |

METHOD OF DISPLAYING A MAP VIEW AND NAVIGATION DEVICE

TECHNICAL FIELD

Various embodiments relate to methods of displaying a map view of a road segment network for navigation of a vehicle and in a navigation device. In particular, various embodiments relate to techniques where a graphical representation of predictive traffic information is displayed for a plurality of road segments at an estimated time of passing for each one of the plurality of road segments.

BACKGROUND

It is known to provide predictive traffic information, i.e., a forecast of the traffic situation in the future. Such techniques find application, e.g., in advanced vehicle navigation. Further, techniques are known to transmit predictive traffic information via a wireless connection, e.g., by employing broadcast or a mobile communications network. The employed protocol may vary and relate to, e.g., the Transport Protocol Experts Group (TPEG) protocol as specified by the Traveller Information Services Association (TISA) as part of the traffic forecast and prediction (TFP) data structure.

By such information, the driver of a vehicle is enabled to better plan and foresee possible delays and obstructions due to certain traffic conditions. For example, from U.S. 2009/0018759 A1 it is known to display predicted traffic information on a display within a certain focused time band, i.e., a certain future time period specified by beginning and end times. For example, a user may select the time band of the traffic information to be displayed. With such techniques, a user may get an overview of the forecast traffic situation in a spatio-temporal resolved manner by selecting a certain future point in time and displaying the predictive traffic information for that selected future point in time in the corresponding time band.

However, such techniques face certain restrictions. For example, to get an extensive overview of the forecast traffic situation it may be necessary for the user to select a plurality of future points in time, i.e., scroll through time in order to estimate when and where possible delays and obstructions may occur. This typically makes it necessary that a large amount of information is analyzed by the user which is time-consuming and may distract the driver from other tasks, including driving. Safety concerns may result.

Therefore, a need exists for more advanced techniques of displaying predictive traffic information. In particular a need exists for such techniques which provide a comprehensive overview of the spatial-temporal future development of the traffic situation.

SUMMARY

This need is met by the features of the independent claims. The dependent claims define embodiments.

According to an aspect, a method of displaying a map view of a road segment network for navigation of a vehicle is provided. The map view includes a graphical representation of predictive traffic information for a plurality of road segments. The method comprises determining the plurality of road segments in dependence of a field of view of the map view and/or in dependence of a distance to the current position of the vehicle. The method further comprises, for each one of the plurality of road segments of the road segment network: determining an estimated time of passing of the respective road segment. The method further comprises displaying the map view including the graphical representation of the predictive traffic information for the plurality of road segments. The graphical representation illustrates the predictive traffic information at the respective estimated time of passing of each one of the plurality of road segments.

The estimated time of passing may be defined as the approximate and/or predicted point in time or time period when the vehicle reaches the respective road segment. For example, in a simple scenario the estimated time of passing for a given road segment may be determined based on a distance of a given road segment to the current position of the vehicle and/or a current velocity of the vehicle and/or a current driving direction of the vehicle and/or a current road hierarchy class on which the vehicle is travelling and/or a road hierarchy class of all upcoming road segments up to and including the given road segment and/or speed limits on those road segments. The distance to a current position may correspond to the linear distance, i.e., as the birds fly, between the current position and the respective road segment and/or may correspond to the distance along road segments of the road segment network. Other influencing factors may be alternatively or additionally considered. By such means it may be possible to determine the estimated time of passing at a comparably low accuracy, i.e., with a comparably low level of confidence, while, at the same time, only a limited amount of computational resources is required.

For example, the estimated time of passing may be determined as an absolute point in time or as time period with respect to current time. In other words, the estimated time of passing a given road segment may correspond to an approximated duration to reach the given road segment with respect to a current time.

The determining of the plurality of road segments may correspond to selecting each one of the plurality of road segments from a map database in which the road segment network is stored. The map database may be provided by a map database provider on a non-volatile storage medium and/or at least partly from remote sources which may be accessed via the Internet.

For example, the determining of the plurality of road segments may yield all such road segments which are currently visible in the field of view of the map view. For example, the field of view of the map view may depend on a magnification scale of the map view which may be selectable by the user. For a larger (smaller) field of view, a larger (smaller) number of road segments may be included in the plurality of road segments.

When the estimated time of passing is available for each one of the plurality of road segments, it becomes possible to display the map view including the graphical representation such that the predictive traffic information for each one of the plurality of road segments is displayed for the respective estimated time of passing. By such means, the effect may be obtained that within one and the same map view, predictive traffic information is displayed for various road segments which corresponds to different future points in time. In other words, it may be possible that, for at least two different road segments of the plurality of road segments, the graphical representation illustrates the predictive traffic information at different estimated times of passing.

More generally, the predictive traffic information is therefore displayed at a certain spatio-temporal resolution such that, at a given road segment, the respective predictive traffic information is displayed which corresponds to the predictive traffic information provided for the estimated time of passing when the vehicle may actually reach the given road segment. By such means, a user may perceive, at one glance, the entire forecast traffic situation which is presently relevant given the current position of the vehicle. In particular, it may be expendable to select a future point in time and display predictive traffic information for the selected future point in time; rather, it becomes possible to automatically select the relevant future point in time individually for each one of the plurality of the road segments.

As mentioned above, in a simple scenario, the estimated time of passing for a given road segment may be determined based on the current position of the vehicle and further based on a distance of the given road segment with respect to the current position of the vehicle. However, more complex scenarios which allow determining the estimated time of passing more accurately may be employed.

For example, the determining of the estimated time of passing for a respective one of the plurality of road segments may include executing a road network search between the current position of the vehicle and the respective road segment. The road network search may expand route links along the road segments of the road segment network and may yield an optimized route to each one of the plurality of road segments.

For example, the route yielded by the road network search may be optimized with respect to elements selected from the group comprising: travel time; travel distance; energy consumption; user preferences. For example, the road network search may yield a so-called eco-route which minimizes the energy consumption between each one of the plurality of road segments and the current position of the vehicle.

For example, when determining the estimated time of passing, it may be possible to disregard U-turns. For example, the estimated time of passing for reaching a given road segment may correspond to the most direct path to reach the given road segment, e.g., without any U-turns or deviations.

The executing of a road network search may be performed, e.g., for each one of the plurality of road segments. In such a scenario, the determining of the estimated time of passing may require a comparably large amount of computational resources. However, at the same time, the estimated time of passing may be determined at a comparably high accuracy. It is also possible that a single road network search expands the route links from a current position such that, e.g., one after another, each one of the plurality of road segments is covered by the road network search thereby yielding the respective estimated times of passing. Sometimes, this scenario is referred to as visiting each one of the plurality of road segments one after another by expanding route links.

For example, the road network search may be selected from the group comprising: a static road network search based on time-invariant costs for the road segments; a dynamic road network search based on time-variant costs for the road segments which correspond to the predictive traffic information.

For example, the dynamic road network search may be based on costs which have a discrete time-dependency or a smoothly varying time-dependency. In particular, the dynamic road network search may consider predictive costs which are provided for future points in time. It is possible that the static road network search is based on costs of the current point in time, e.g., reflecting present traffic situation.

For example, various algorithms are known which enable to implement the static road network search. One algorithm known to the skilled person is the Dijkstra algorithm, which is based on time-invariant costs such as travel time and/or travel distance and/or energy consumption, or a combination thereof. For example, the computational resources required for executing the static road network search may be comparably limited if compared to the computational resource required for executing the dynamic road network search. It is known that the Dijkstra algorithm visits various road segments one after another; in this light, a single execution of the Dijkstra algorithm—or a derivate thereof—may be employed in order to determine the estimated times of passing for each one of the plurality of road segments.

In particular, the dynamic road network search may take into consideration the time-varying costs which may be determined differently for different future points in time based on the predictive traffic information. With such techniques it becomes possible to determine the estimated time of passing for each road segment at an even higher accuracy. In particular, while the estimated time of passing is used for displaying the graphical representation of the predictive traffic information as outlined above, it also becomes possible to consider the predictive traffic information when determining the estimated time of passing. Of course, further knowledge beyond the predictive traffic information may be used for the time-varying costs.

The road network search may be a static road network search which is executed in a piecewise manner. The pieces of the road network search may expand route links along road segments of the road segment network which are reachable within a certain duration interval and/or have a certain distance to the current position.

Such an approach may significantly reduce the computational efforts needed to determine the estimated time of passing each one of the plurality of road segments. E.g., the piecewise road segment search may employ techniques according to EP 12 164 556. In general, it may be possible to treat different pieces of the static road network search in a different manner, e.g., by varying one or more parameters of the road network search. Such parameters may be selected from the group comprising: refresh rate for newly executing the road network search, e.g., upon a change of the current position, number of considered road segments, road hierarchy classes considered when executing the road network search, type of considered costs level of abstraction. This may correspond to various levels of accuracy, e.g., by respectively thinning out the network of road segments on which the road network search operates for example by only considering road segments of a given hierarchy class, and/or an update interval, i.e., by appropriately setting the interval of re-execution of the road network search differently for different pieces of the road network search. For example, it may be possible to execute the road network search at a higher level of accuracy (lower level of accuracy) by considering roads of all hierarchy classes (only roads of higher hierarchy classes) at distances which are closer (further away) from the current position of the vehicle.

Respectively, it is possible to execute the road network search more often (more seldom) for road segments which are closer (further away) from the current position of the vehicle. Different dependencies may apply. By such a piecewise execution of the road network search, it may be possible to reduce the computational efforts needed for the determining of the estimated time of passing. This piecewise execution of the road network search may correspond to a so-called conquer-and-divide approach known in information technologies where a complex overall task is divided in a plurality of sub-tasks, thereby reducing the overall computational resources needed to solve the task.

For example, the predictive traffic information may be provided at a 15 minute resolution, i.e., for the time intervals 0-15 min and 15-30 min and 30-45 min, etc. Other time interval durations may apply.

It may also be possible that the predictive traffic information is provided for forecast time intervals. The duration intervals of the pieces of the road network search may correspond to the forecast time intervals of the predictive traffic information. The costs of each piece of the road network search may be determined based on the predictive traffic information of the corresponding forecast time interval.

In other words, for certain forecast time intervals, a so-called estimated time of passing range may be obtained which corresponds to the subset of road segments of the plurality of road segments which are reachable within the forecast time interval. For each piece of the road network search specific costs may be considered when expanding the route links. In this regard, an abort criterion may be implemented which corresponds to the estimated time of passing reaching the boundary of a forecast time interval. Corresponding forecast and duration intervals may be at least overlapping or may be identical.

Such a solution may be referred to as a semi-dynamic road network search as it can consider different costs for different pieces of the road network search; different pieces of the road network search, in turn, can correspond to different time intervals. Thereby, even if each piece of the road network search considers, per-se, static costs, when considering the entirety of the pieces of the road network search, a time dependency may be modelled. For example, for times corresponding to 0-15 minutes (15-30 minutes) from current time, costs corresponding to a forecast time interval of 0-15 minutes (15-30 minutes) may be used for execution of the road network search, e.g., cost for a given road segment can amount to 25 min/km (5 min/km)—in latter example, a traffic congestion may be predicted to resolve for the time period of 15-30 min. It is also possible that the costs are defined in relative terms, e.g., with respect to a reference speed. In general, the accuracy of such a semi-dynamic road network search may be lower than the accuracy of a dynamic road network search which considers truly time-dependent costs.

An abort criterion for each piecewise execution of the road network search may correspond to the estimated travel time to reach a respective road segment reaching the end of a duration interval, respectively forecast time interval. For example, a first piece of the road network search may correspond to road segments which are reachable within a first duration interval and a second piece of the road network search may correspond to road segments which are reachable within a second duration interval. The second duration interval may include longer times to reach a respective road segment than the first duration interval. The road network search may be executed at a higher degree of abstraction for the second piece than for the first piece. For example, as mentioned above, the higher degree of abstraction may correspond to a thinning out of the road segment network on which the road network search operates. For example, in this regard a technique as described by European patent application EP 12 164 556 may be employed.

For example, the road network search may operate on a subset of road segments of a road segment network. The subset of road segments may be selected from the group comprising: road segments of the road segment network having a predefined road hierarchy class; road segments of the road segment network being situated within a threshold distance to the current position of the vehicle; road segments of the road segment network having an associated likelihood of passage by the vehicle which is higher than the threshold likelihood, the likelihood being optionally determined based on at least one of the following: a historical driving pattern, a current driving direction, a road hierarchy class.

By such techniques it may be possible to thin out the network of road segments, thereby reducing computational efforts which are necessary to determine the estimated time of passing. In particular, it may be possible to restrict the road network search to such road segments which significantly influence the estimated time of passing: in this regard, the road segments of the subset of road segments may correspond to road segments having a comparably low or high hierarchy class, e.g., depending on a distance to the current position of the vehicle. It is possible that the road network search is executed until an abort criterion is fulfilled. The abort criterion for the road network search as a whole may be defined with respect to elements selected from the group comprising: the estimated time of passing having been determined for all road segments within the field of view of the map view for which the predictive traffic information is available; the estimated time of passing having been determined for all road segments within a threshold distance from the current position of the vehicle the estimated time of passing having been determined for all road segments within a threshold time of travel from the current position.

Typically, the predictive traffic information may not be available for all road segments of the road segment network. It may be possible that the predictive traffic information is only available for certain road segments of the plurality of road segments. This may be because traffic obstructions or delays may only occur for a certain fraction of all road segments of the road segment network. Then it may be expendable to provide the predictive traffic information even for such road segments or the road segment network when no delays or obstructions are expected. Furthermore, it may be possible that the predictive traffic information is only provided for such road segments which have a comparably high road hierarchy class. For example, predictive traffic information may be provided for highways and arterial roads, but not or only to a limited degree for local roads.

For example, the threshold time of travel may correspond to the maximum future point in time for which predictive traffic information is still available. For example, predictive traffic information may be available for the next two hours; then, once the estimated time of passing has reached two hours from the current time when determining the estimated time of passing, the determining of the estimated times of passing may stop.

For example, in a simple scenario it is possible to commence with the next iteration of the determining of the estimated times of passing as soon as the abort criterion has been fulfilled or the predictive traffic information has been updated or the current position of the car has changed by more than a certain threshold.

By appropriately defining the abort criterion, it may be possible to provide the user with an extensive overview of the forecast traffic situation, while, at the same time, the amount of computational resources which is needed for implementing the method according to the presently discussed aspect may be comparably limited.

In various scenarios it is possible to execute the road network search as discussed above equally for various directions around the current position of the vehicle. In other words, the route links may be expanded for all directions around the current position of the vehicle. Road segments which are more or less equally distributed around the current position may be visited by the road network search. Equally distributed may correspond to: a spatial density of visited road segments at a given distance to the current position showing no or only a small dependency on a radial angle with respect to the current position.

However, it is also possible to define preferred directions and/or consider various other aspects when determining the estimated time of passing in order to reduce computational resources. For example, the determining of the plurality of road segments may further be dependent on elements selected from the group comprising: a current direction of a driving of a vehicle; a road hierarchy class of the respective road segment; a likelihood of passing of the respective road segment being larger than a threshold likelihood; predictive traffic information being available for a respective road segment.

In general, the plurality of road segments may be situated within a threshold distance from the current position of a vehicle and/or may be situated along a pre-calculated route for which the navigation of the vehicle is provided. For example, if a pre-calculated route is being followed by the vehicle to reach a previously defined destination, it may be possible to determine the plurality of road segments such that they are all situated along the pre-calculated route. This may correspond to a situation where a comparably large likelihood exists for a road segment being situated along the pre-route to be passed by the vehicle in the future.

In general, the plurality of road segments may be distributed in various directions around the current position of the vehicle and/or may correspond to all road segments which are visible in the map view and for which predictive traffic information is available.

For example, the predictive traffic information may be received via wireless connection such as multicast radio broadcast and/or by a mobile telephony network, respectively a mobile communications network such as according to the Third Generation Partnership Programme (3GPP). The predictive traffic information may be encoded according to a certain standardized encoding scheme, e.g., according to the TPEG TFP data format. The predictive traffic information may correspond to flow information, e.g., free-flowing or stopping traffic, and/or to an average velocity and/or to a traffic congestion and/or to a road or lane closure and/or to other traffic events which cause traffic disturbance and/or delays. In this regard, various event codes may be relied upon as defined within the TPEG framework. For example, the predictive traffic information may be provided for forecast time intervals.

The method may further comprise interpolating the predictive traffic information over time based on the predictive traffic information for two adjacent forecast time intervals of the same road segment. Alternatively or additionally, the method may further comprise interpolating the predictive traffic information over space based on the predictive traffic information for two adjacent road segments for the same future time interval.

By such means, i.e., by relying on an interpolation in space and/or in time, a more homogenous appearance of the map view including the predictive traffic information may be achieved. In particular, effects resulting from the discretization of the predictive traffic information provided for the forecast time intervals and/or by a piecewise execution of the road network search as mentioned above may be avoided. A consistent spatio-temporal evolution of the display predictive traffic information may be achieved.

For example, depending on the type of the predictive traffic information, various graphical representations may be appropriate. In general, the graphical representation of the predictive traffic information may comprise elements selected from the group comprising: a colour marking of each one of the plurality of road segments; a graphical indication of the estimated time of passing; a level of confidence of the predictive traffic information and/or the estimated time of passing. For example, the colour marking may correspond to an estimated average velocity which may be included implicitly or explicitly in the predictive traffic information or which may be determined based on the predictive traffic information; the colour marking may also correspond to a ratio of the estimated velocity with respect to a reference velocity or speed limit which, e.g., may be available for various road hierarchy classes. It is also possible that the colour marking corresponds to flow information which is included in the predictive traffic information. The graphical indication of the estimated time of passing may be achieved by explicitly displaying the estimated time of passing in a vicinity of at least some of the plurality of road segments. It may also be possible to display in the map view bounding lines which graphically illustrate boundaries of discretized intervals of estimated times of travel to certain subsets of the plurality of road segments. For example, these bounding or contour lines may graphically delimit such road segments which are reachable within times between 0 and 15 minutes from other road segments which are reachable between 15 and 30 minutes. In other words, the bounding lines may correspond to isolines illustrating a given estimated time of passing, in the above example 15 min.

According to a further aspect, a navigation device for displaying a map view of a road segment network for navigation of a vehicle is provided. The map view includes a graphical representation of predictive traffic information for a plurality of road segments. The navigation device comprises a processor which is configured to determine the plurality of road segments in dependence of a field of view of the map view and/or in dependence of the distance to a current position of the vehicle. The processor is further configured to determine an estimated time of passing of the respective road segment, for each of the plurality of road segments of the road segment network. The navigation devices further comprises a display which is configured to display the map view including the graphical representation of the predictive traffic information. The graphical representation illustrates the predictive traffic information at the respective estimated time of passing of each one of the plurality of road segments.

For example, the navigation device according to the presently discussed aspect may be configured to execute a method of displaying a map view according to a further aspect.

For such a navigation device, effects may be obtained which are comparable to the effects which may be obtained with a method of displaying a map view according to a further aspect.

According to a further aspect, a method of executing a dynamic road network search is provided. The dynamic road network search is based on predictive traffic information which is provided for a first forecast time interval and a second time interval. The method comprises executing a first static road network search which expands route links along a first plurality of road segments of a road segment network. The method further comprises executing a second static road network search which expands route links along a second plurality of road segments of the road segment network. Each expanded route link is associated with a respective estimated time of passing. The first forecast time interval comprises the estimated times of passing associated with the route links expanded by the first static road network search and the second forecast time interval comprises the estimated times of passing associated with the route links expanded by the second static road network search.

The dynamic road network search may correspond to considering time-variant costs; the static road network searches may correspond to considering time-invariant costs. Such a technique as described above may also be referred to as a semi-dynamic road network search. For example, the expanding of links by the first and second road network searches may be dependent on costs. The first and second road network searches may consider static costs, i.e., while executing the first and second road network searches, the costs may not vary. In other words, each of the first and second road network searches may rely on a constant and time-invariant set of costs associated with the corresponding road segments.

A time-dependency is obtained by executing the first and second road network searches which, in general, can rely on different costs. A time-dependency of the costs may be considered by taking into account different costs for the first and second road network searches. In particular, the first and second road network searches may be associated with different forecast time intervals of the predictive traffic information. E.g., if the predictive traffic information predicts a change in the traffic situation such as an upcoming road blockage or reduced average velocity, this may be modelled by a change in the respective costs associated with the first and second plurality of road segments.

An abort criterion of the first (second) road network search may be: the estimated time of passing reaching the end of the first (second) forecast time interval. It is possible that the first and second time intervals are adjacent. Then it may be possible that the second road network commences with expanding links where the first road network search has stopped. By such means, a smooth and steady transition between the expanding of links by the first and second road network searches may be obtained.

For example, the road network search may correspond to the Dijkstra-algorithm or a derivate thereof.

By such techniques as described above, it may be possible to obtain various effects: It may be possible to consider a time-dependency of the cost when executing the road network search—while, at the same time, employing of algorithms of the road network search may be possible which are inherently time-independent. In other words, the overall road network search may be divided into sub-searches. While the overall road network search considers a time dependency, the sub-searches may be time-independent which enables to apply a greater variety of techniques. The time dependency of the overall road network search is obtained by a difference in the costs considered by the sub-searches. Further, such time-independent techniques may require comparably fewer computational resources; in particular, if compared to a fully dynamic road network search. Thereby, the overall computational resources may be reduced by the techniques as described above. At the same time, a comparably high accuracy of the road network search may be obtained—in particular if compared to a scenario which considers time-invariant costs, e.g., by neglecting any predictive traffic information.

According to a further aspect, a navigation device is provided which his configured for executing a dynamic road network search. The dynamic road network search is based on predictive traffic information which is provided for a first forecast time interval and a second time interval. The navigation device comprises at least one processor which is configured to execute a first static road network search which expands route links along a first plurality of road segments of a road segment network; and to execute a second static road network search which expands route links along a second plurality of road segments of the road segment network. Each expanded route link is associated with a respective estimated time of passing. The first forecast time interval comprises the estimated times of passing associated with the route links expanded by the first static road network search and the second forecast time interval comprises the estimated times of passing associated with the route links expanded by the second static road network search.

For example, the navigation device of the presently discussed aspect may be configured to execute the method of executing a road network search according to a further aspect.

For such a navigation device effects may be obtained which are comparable to the effects which may be obtained by the method of executing a road network search according to a further aspect.

It is to be understood that features mentioned above and features yet to be explained below can be used not only in the respective combinations indicated, but also in other combinations or in isolation, without departing from the scope of the present invention. Features of the above mentioned aspects and embodiments may be combined with each other in other embodiments.

BRIEF DESCRIPTION OF THE DRAWINGS

In the following, various embodiments will be explained in further detail with respect to embodiments illustrated in the accompanying drawings. In the drawings.

DETAILED DESCRIPTION OF EMBODIMENTS

In the following, various embodiments will be described in detail with reference to the accompanying drawings. It is to be understood that the following description of embodiments is not to be taken in a limiting sense. The scope of the invention is not intended to be limited by the embodiments described hereinafter or by the drawings, which are to be taken illustratively only.

The drawings are to be regarded as schematic representations and elements illustrated in the drawings are not necessarily shown to scale. Rather, the various elements are represented such that their function in general purpose become apparent to the person skilled in the art. Any connection or coupling between functional blocks, devices, components or other physical or functional units shown in the drawings or described herein may also be implemented by an indirect connection of coupling. A coupling between components may be established over wireless connection. Functional blocks may be implemented in hardware, firmware, software, or a combination thereof.

In the following, techniques of displaying a map view of a road segment network for navigation of a vehicle are described. In the map view, certain graphical representations illustrate predictive traffic information. For various locations, respectively road segments, for which the predictive traffic information is provided, an estimated time of passing is determined. It is then possible to illustrate the predictive traffic information in the map view at the respective estimated time of passing. For example, a first predictive traffic information (second predictive traffic information) which is illustrated in the map for a first road segment (second road segment) which is closer (further away) from a current position of the vehicle may correspond to a future point in time which is comparably prompt (delayed) with respect to the current point in time; therefore, the first and second predictive traffic information are displayed for different point in times in the map view.

Figure 1:
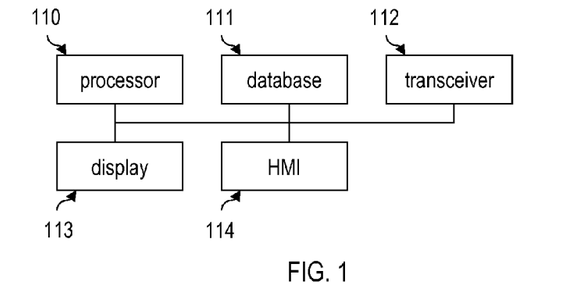
FIG. 1 is a schematic illustration of a navigation device according to various embodiments.

In FIG. 1, a schematic illustration of a navigation device 100 which is configured for displaying such a map view of a road segment network for navigation of the vehicle is illustrated. The navigation device 100 comprises a processor 110, e.g., a multi-core processor or a plurality of processors. The processor 110 is configured for executing various tasks, including, but not limited to: performing a road network search for determining an optimum route to various points within the road segment network; decoding and evaluating received predictive traffic information; rendering various graphical representations to be included in the map view.

For example, the processor 110 can operate according to various standards in relation with the road segment network and/or the predictive traffic information. For example, the road segment network may be stored in a database 111 according to the navigation data standard (NDS) of the NDS Association. Other data formats are possible. Likewise, it is possible that the processor 110 is configured for decoding and generally working with predictive traffic information which is stored in the TPEG format. In this regard, TPEG event codes may be stored in the database 111. Other data formats are possible for the predictive traffic information, e.g., the Traffic Message Channel (TMC) data format. The navigation device 100 comprises a transceiver 112 which is configured for receiving such predictive traffic information. For example, the transceiver 112 may be a uni-directional receiver which is configured for receiving broadcast data traffic according to the TPEG or TMC standard. It is also possible that the transceiver 112 establishes a connection with a mobile communications network such as the predictive traffic information may be received by the transceiver 112 upon request, e.g., by the processor 110.

The processor 110 is configured to render the map view based on data obtained from the database 111 and/or from the transceiver 112. Then, a display 113 of the navigation device 100 is configured to display the map view including the graphical representation of the predictive traffic information for a plurality of road segments.

The navigation device 100 further comprises a human machine interface (HMI) 114 which is configured to receive input from a user, e.g., the driver of a vehicle. Furthermore, the HMI 114 is configured to provide output to the user such that user interaction for the control of the navigation device 100 becomes possible.

Figure 2:
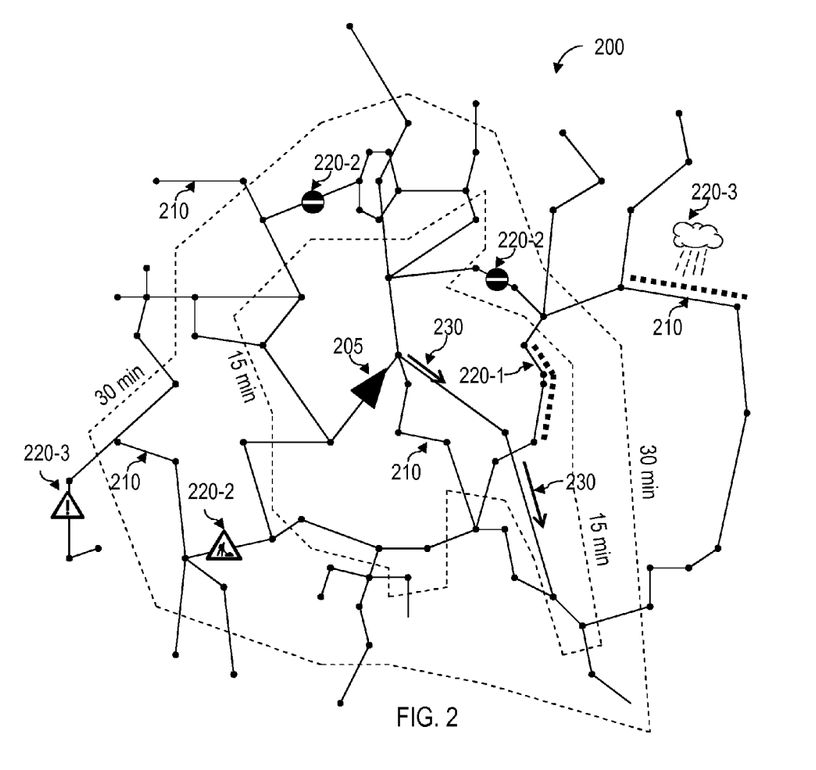
FIG. 2 shows a map view including graphical representations of predictive traffic information at respective estimated times of passing.

In FIG. 2, a schematic illustration of the map view 200 is provided. Illustrated in FIG. 2 are the road segments 210 of the road segment network. The road segments 210 in FIG. 2 are shown as being bounded by nodes (illustrated in FIG. 2 as dots). For example, according to various data standards, the nodes may have a defined geographical position such as longitude and latitude and the corresponding road segment 210 may be formed by the respective interconnection in-between the two nodes. Furthermore shown in FIG. 2 is current position 205 of the vehicle. In the scenario of FIG. 2, the current position 205 is approximately in the centre of a map view 200. A planned route 230 is also illustrated in FIG. 2. The planned route 230 is provided by the navigation device 100 to provide route guidance to a destination. E.g., the planned route 230 may be the fastest or shortest route to the destination.

Furthermore, shown in FIG. 2 is a plurality of graphical representations of predictive traffic information 220-1, 220-2, 220-3. For example, the predictive traffic information depicted in FIG. 2 corresponds to a traffic congestion, road closure, construction work ongoing, dangerous situation, and heavy rain. Various other traffic situations may be described by the predictive traffic information 220-1, 220-2, 220-3. The predictive traffic information 220-1, 220-2, 220-3 is associated with a road segment 210 and illustrated in the map view 200 in close vicinity to the respective road segment 210. In the embodiment of FIG. 2, there is a total of six road segments 210 for which predictive traffic information 220-1, 220-2, 220-3 is provided.

For each one of this plurality of road segments 210, the processor 110 is configured to respectively determine an estimated time of passing. In a simple scenario, a distance between the current position 205 of the vehicle and the respective road segment 210 can be used by the processor 110 to obtain an approximation of this estimated time of passing. In such a scenario, road segments 210 which are situated closer (further away) from the current position 20 of the vehicle can have a prompt (delayed) estimated time of passing.

Sometimes it is desirable to more accurately determine the estimated time of passing. In such a scenario, the processor 110 is configured to execute a road network search between the current position 205 of the vehicle and the respective road segments 210. Typically, such a road network search expands route links along the road segments 210 of the road segment network and yields an optimized route to each one of the plurality of road segments 210 for which the predictive traffic information is available. The optimized route can be optimized with respect to various criterions such as minimum travel time, minimum travel distance, minimum energy consumption, or a combination thereof. The particular criterion may reflect driver habits. This road network search may in particular be independent of the planned route 213; for example, such a road network search may be executed even if no planned route 230 is available.

In the embodiment of FIG. 2, isolines corresponding to 15 minutes estimated time of passing and 30 minutes estimated time of passing are depicted with a dashed line. For example, all road segments which are situated between the isoline corresponding to 15 minutes estimated time of passing and the isoline corresponding to 30 minutes estimated time of passing have a determined estimated time of passing which lies in the time interval between 15 and 30 minutes, i.e. all these road segments can presumably be reached within 15 to 30 minutes.

Once the estimated time of passing has been determined, e.g., by employing the road network search as mentioned above, for each one of the plurality of road segments 210 the graphical representation for the predictive traffic information 220-1, 220-2, 220-3 is provided in the map view 200 at the corresponding estimated time of passing. In practice, this means that a given predictive traffic information 220-3 is displayed at a corresponding different estimated time of passing than a further predictive traffic information 220-1 (cf. FIG. 2).

Figure 3:
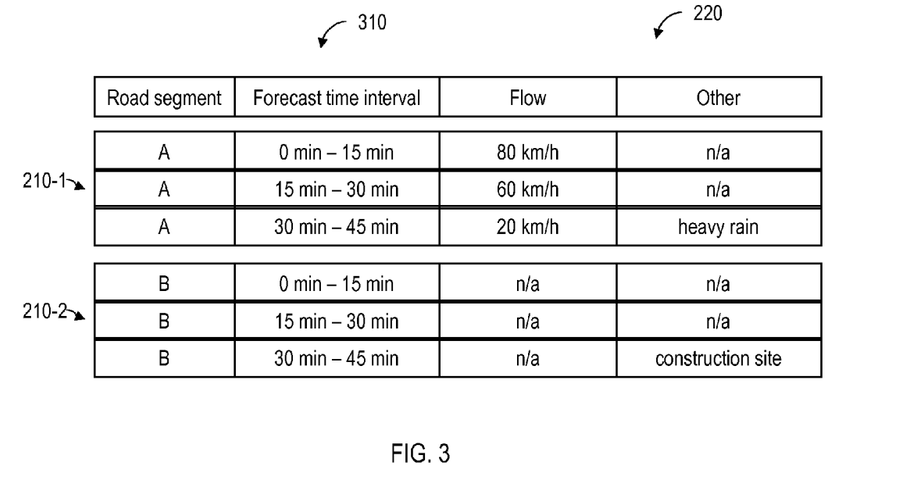
FIG. 3 illustrates predictive traffic information which is provided for future time intervals.

In FIG. 3, an example implementation of the predictive traffic information 220 is provided for two road segments 210-1, 210-2. As can be seen, the predictive traffic information 220 can include forecast traffic flow information and/or various events which are likely to have an impact on the traffic situation. Typically, the predictive traffic information 220 is provided for forecast time intervals, e.g., in the scenario o FIG. 3 with a time resolution of 15 minutes. This may be done in order to save bandwidth for wireless transmission and/or due to a limited accuracy in the prediction of the future traffic situation. An alternative solution to the forecast time intervals would be to specify validity ranges of the predictive traffic information which cover certain flexible time durations.

Figure 4A:
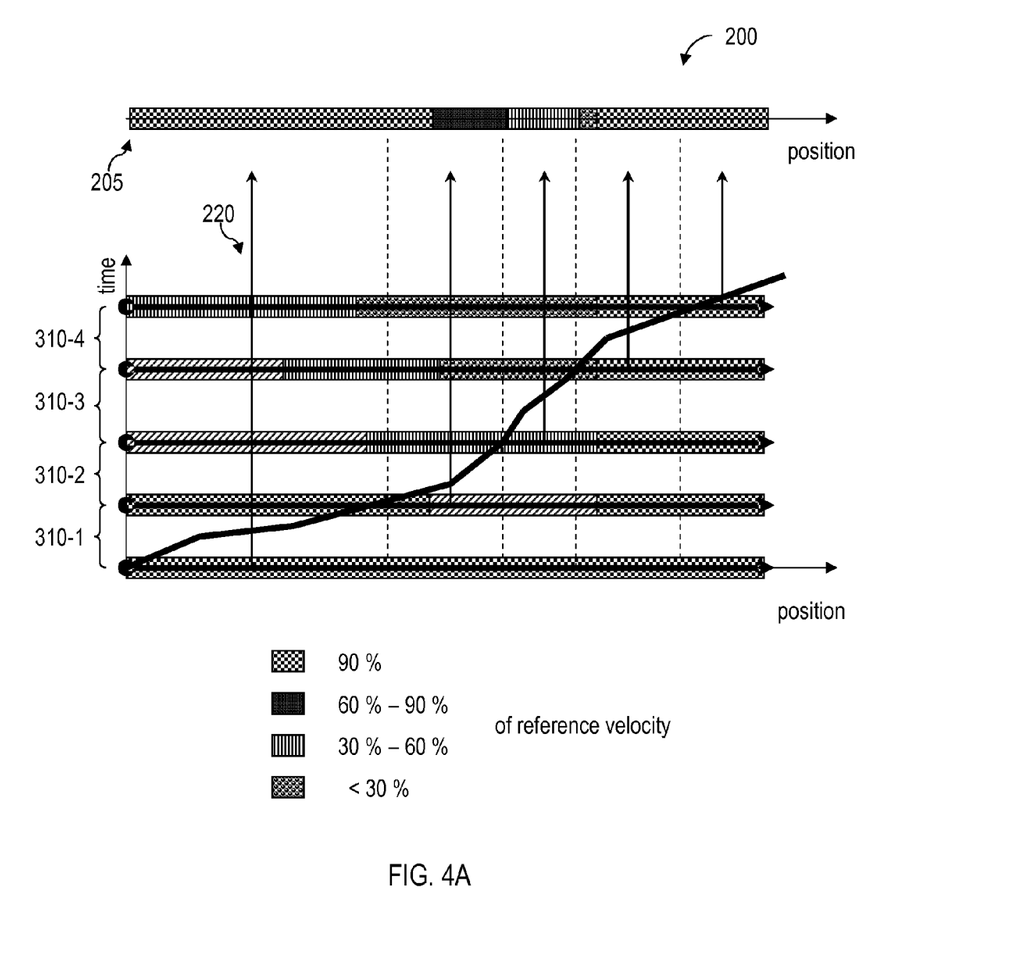
FIG. 4A illustrates the spatio-temporal evolution of a forecast traffic situation.

In general, when determining the estimated time of passing for the plurality of road segments 210, it may be desirable to provide the estimated time of passing at a temporal resolution which is of the same magnitude as the temporal resolution of the predictive traffic information 220, 220-1, 220-2, 220-3. This may allow to reduce required computational efforts while, at the same time, the accuracy of the illustrating of the predictive traffic information 220, 220-1, 220-2, 220-3 is not unduly reduced. Turning to FIG. 4A, a scenario is illustrated where the predictive traffic information 220, 220-1, 220-2, 220-3 includes forecast flow information. The forecast flow information, in the scenario of FIG. 4A corresponding to average velocities expected at a certain road segment, is illustrated with different filling patterns on the horizontal axis of FIG. 4A. The various average velocities are determined with respect to a reference speed. E.g., the reference speed may be defined with respect to a road hierarchy class of certain road segment. For example, the reference speed may amount to 120 km/h or any other value.

The predictive traffic information 220 is provided for four forecast time intervals 310-1, 310-2, 310-3, 310-4 illustrated on the vertical axis. Furthermore, the predictive traffic information 220 is provided for a number of road segments illustrated on the horizontal axis. The temporal evolution of the vehicle position is obtained from the road network search and is illustrated by a full line. For a given road segment, the estimated time of passing corresponds to the respective time as indicated by the vehicle position.

As can be seen form FIG. 4A, the predictive traffic information 120 changes over the course of future times. For each position, over the course of time different forecast flow situations are encountered. In FIG. 4A, upper part, the corresponding graphical representation of the predictive traffic information 220 as included in the map view 200 is illustrated. As can be seen, the predictive traffic information 220 is respectively illustrated at the corresponding estimated time of passing of the corresponding road segment, i.e., with a spatio-temporal resolution. As the predictive traffic information 220 is provided for the forecast time intervals 310-1, 310-2, 310-3, 310-4 in a discretized manner, it may desirable to further interpolate the predictive traffic information 220 over time based on the predictive traffic information 220 for two adjacent forecast time intervals 310-1, 310-2, 310-3, 310-4 of the same road segment. Likewise, it can be desirable to interpolate the predictive traffic information over space based on the predictive traffic information 220 for two adjacent road segments 210 for the same forecast time interval 310-1, 310-2, 310-3, 310-4.

Various techniques may be employed to graphically illustrate the predictive traffic information 220. For example, if the predictive traffic information 220 corresponds to forecast flow information, different filling patterns for the road segments 210 in the map view 200 may be used, e.g., as illustrated in FIG. 4A. It is also possible to use different colours which correspond to different forecast flow information; for example, green (red) colour can correspond to free flow in traffic (heavily disturbed traffic). Likewise, various graphical representations may be used for other predictive traffic information 220, e.g., corresponding to traffic congestion, road construction site, etc. as illustrated in FIG. 2. For example, it may be possible to additionally provide a graphical indication of the estimated time of passing such as the isolines used in FIG. 2 and/or over level of confidence of the predictive traffic information 220. For example, larger (smaller) level of confidence may be graphically illustrated using a smaller (larger) degree of transparency of the graphic illustration of the corresponding traffic information. It may be possible that the level of confidence is provided as part of the predictive traffic information. It is also possible that the level of confidence is determined based on the predictive traffic information, e.g., such that for predictive traffic information relating to a point in time in the more distant (closer) future a smaller (larger) level of confidence is assumed.

Executing the road network search between the current position 205 and the plurality of road segments 210 may require significant computational resources. In this regard, it may be possible to restrict the execution of the road network search to such road segments 210 for which predictive traffic information 220, 220-1, 220-2, 220-3 is available. It may also be possible that the road network search is executed for all road segments 210 which lie within a threshold distance and/or fulfil alternative abort criteria, such as a threshold travel time to reach the respective road segment 210 and/or the respective road segment 210 being situated within a field of view of the map view 200. By defining such an appropriate abort criterion, it is possible to limit the required computational resources for determining the estimated time of passing by executing the road network search.

Another strategy of reducing the required computational efforts—which may be employed alternatively or additionally to the above—for executing the road network search when determining the estimated time of passing is to employ a static road network search. The static road network search uses time-invariant costs for the road segments 210 when expanding the route links. In other words, even if the estimated time of passing is used for graphically indicating the predictive traffic information 220 in the map view 200, it may be expendable to employ a dynamic road network search which also considers time-variant costs corresponding to the predictive traffic information 220. However, employing such a dynamic road network search is also possible. Typically, executing the dynamic road network search based on time-variant costs requires higher computational efforts.

Figure 4B:
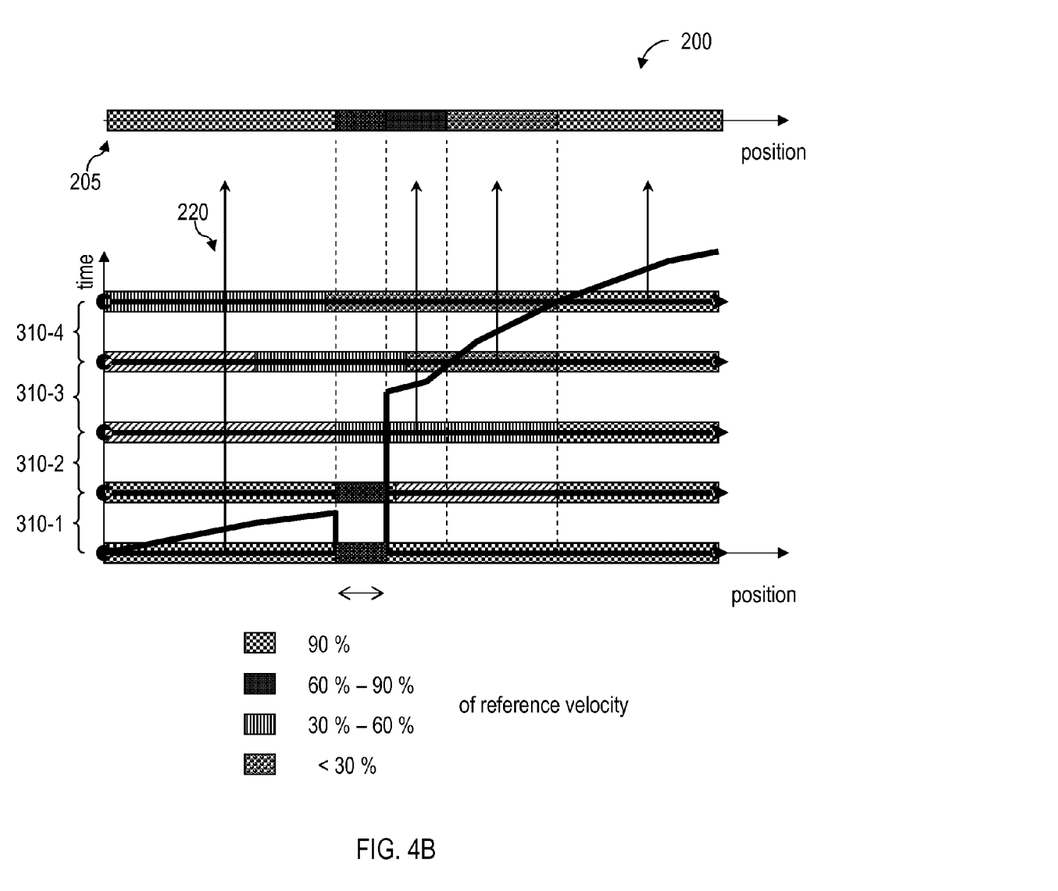
FIG. 4B illustrates the spatio-temporal evolution of a forecast traffic situation where some road segments are unreachable due to road blockage.

In FIG. 4B a further spatio-temporal evolution of predictive traffic information is illustrated. In FIG. 4B, some positions (illustrated by the horizontal arrow) are unreachable, e.g., due to road closure. It is possible to respectively illustrate these road segments in the map view 200, i.e., by marking the correspondingly (full black in FIG. 4B). For road segments which are located behind the unreachable road segment, e.g., as seen from the current position 205, a detour may be calculated.

Sometimes, situations may occur where one or more road segments 210 are not reachable, e.g., due to road closures. In such a scenario the unreachable road segments 210 may not have an associated estimated time of passing—even though they might be situated within a field of view of the map view 200. Then it might be possible to respectively indicate the unreachable road segments 210 in the map view 200. It is also possible to assign a certain estimated time of passing to the unreachable road segments 210 in the map view 200, e.g., the estimated time of passing of the last reachable road segment 210 between the current position 205 and the unreachable road segment 210.

Figure 5:
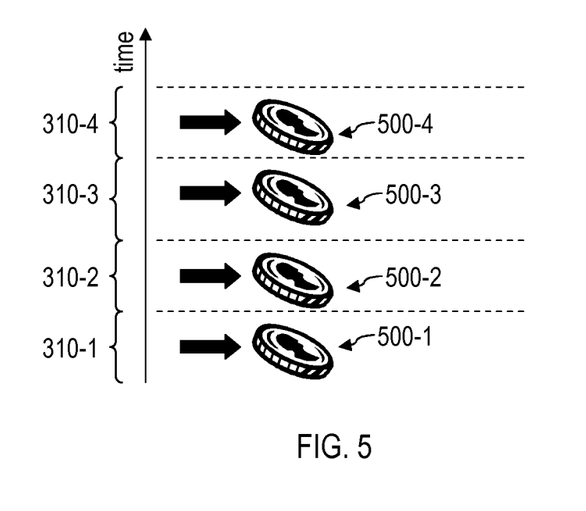
FIG. 5 illustrates schematically a piecewise manner in which a road network search is executed according to various embodiments.

In FIG. 5, a road network search is illustrated which is executed in a piecewise manner. Different pieces of the road network search expand the route links along the road segments 220 of the road segment network based on costs 500-1, 500-2, 500-3, 500-4 which are time-invariant within the forecast time intervals 310-1, 310-2, 310-3, 310-4 of the predictive traffic information 220. In other words, within each forecast time interval 310-1, 310-2, 310-3, 310-4, time-invariant costs 500-1, 500-2, 500-3, 500-4 are used. For example, these costs 500-1, 500-2, 500-3, 500-4 can be determined based on the predictive traffic information 220. For example, the last road segment for which a link is expanded within each forecast time interval 310-1, 310-2, 310-3, 310-4 may determine the position of an isoline (cf. FIG. 2).

The road network search of FIG. 5 may be referred to as a semi-dynamic road network search. Each piece of the semi-dynamic road network search may be a static road network search, e.g., according to the Dijkstra-algorithm, i.e., considering time-invariant costs 500-1, 500-2, 500-3, 500-4. As the costs 500-1, 500-2, 500-3, 500-4 may vary from forecast time interval 310-1, 310-2, 310-3, 310-4 to forecast time interval 310-1, 310-2, 310-3, 310-4, an overall time dependency is modelled.

A further strategy of reducing the required computational efforts when executing the road network search—which may be applied alternatively or additionally to the above—is to perform the road network search in a piecewise manner. For example, it is possible to increase or decrease the degree of abstraction of the road network search for different pieces in which the road network search is executed. For example, for more remote (closer) road segments 210, a higher (lower) degree of abstraction of the road network search may be employed; thereby, a level of accuracy of the road network search may be lower (higher) and, at the same time, the computational resources required may be lower (higher). For example, a different degree of abstraction may be obtained by executing the road network search on a subset of the road segments of the road segment network. In other words, the road segment network can be thinned out. For example, it is possible to rely only on road segments 210 having a predefined road hierarchy class which is, e.g., higher than a threshold hierarchy class; for example, only road segments which correspond to a freeway, highway and arterial roads may be used for the executing of the road network search whereas local roads may be disregarded. Also, the underlying algorithm which is used for said executing of the road network search may provide appropriate means which enable to adjust the degree of abstraction and thereby adjust the required computational resources.

Figure 6:
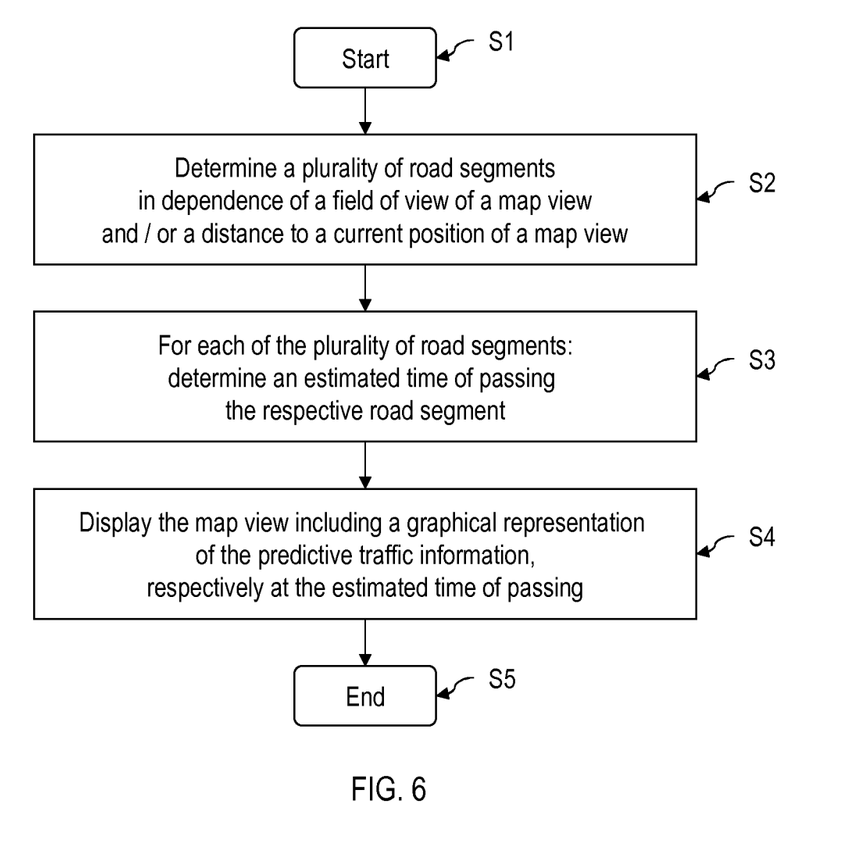
FIG. 6 is a flowchart of method of displaying a map view according to various embodiments.

In FIG. 6, a flowchart of a method of displaying the map view 200 according to various embodiments is illustrated. The method starts with step S1. In step S2, a plurality of road segments 210 is determined in dependence of a field of view of the map view 200 and/or in dependence of a distance to the current position 205 of the vehicle. For example, the plurality of road segments 210 can correspond to all road segments 210 within the field of view of the map view 200 and/or within a given distance to the current position 205 of the vehicle. It is also possible that the plurality of road segments 210 corresponds to all road segments 210 within the field of view of the map view 200 which have a road hierarchy class which is higher than a threshold hierarchy class. In step S3, for each one of the plurality of road segments 210, an estimated time of passing of the respective road segment 210 is determined. For example, the estimated time of passing can be determined using a road network search as mentioned above. In general, if the number of the plurality of road segments for which the estimated time of passing is determined is lower (higher), the required computational efforts can be lower (higher). Therefore, it may be desirable to determine the plurality of road segments 210 in step S2, such that in step S3 the number of road segments for which the estimated time of passing is to be determined is comparably limited. Likewise, as mentioned above, when determining the estimated time of passing based on the execution of a road network search, various techniques exist which allow to reduce the computational efforts when executing the road network search, e.g., by means of the piecewise execution.

In step S4, the map view 200 is displayed including the graphical representation of the predictive traffic information 220, respectively at the estimated time of passing, as mentioned above.

The method ends in step S5.

Although the invention has been shown and described with respect to certain preferred embodiments, equivalents and modifications will occur to others skilled in the art upon the reading and understanding of the specification. The present invention includes all such equivalents and modifications and is limited only by the scope of the dependent claims.

For example, while above reference has been predominantly made to determining of the estimated time of passing locally within the vehicle, it should be understood that such computational expensive tasks may also be executed on a central server, i.e., remote from the vehicle. In this regard, the transceiver 112 of the navigation device 100 can be configured to establish a data connection with the remote server such that, e.g., the current position 205 of the vehicle is transmitted to the remote server which in turn computes the estimated time of passing and the corresponding predictive traffic information at the relevant future point in time as described above and sends it eventually via the data connection to the transceiver 112.

The invention claimed is:

1. A method of executing a dynamic road network search based on predictive traffic information which is provided for a first forecast time interval and a second time interval, the method comprising:
    dividing, via a processor, the dynamic road network search into a first static road network search and a second static road network search,
    executing, via the processor, based on the predictive traffic information received via a transceiver, the first static road network search which expands route links along a first plurality of road segments of a road segment network and considers time-independent first costs; and
    executing, via the processor, based on the predictive traffic information received via the transceiver, the second static road network search which expands route links along a second plurality of road segments of the road segment network and considers time-independent second costs different from the first costs,
    wherein each expanded route link is associated with a respective estimated time of passing,
    wherein the first forecast time interval comprises the estimated times of passing associated with the route links expanded by the first static road network search and the second forecast time interval comprises the estimated times of passing associated with the route links expanded by the second static road network search,
    wherein the first costs are determined based on predictive traffic information for the first forecast time interval, and
    wherein the second costs are determined based on predictive traffic information for the second forecast time interval.

* * * * *